(12) United States Patent
Li et al.

(10) Patent No.: US 8,812,740 B2
(45) Date of Patent: Aug. 19, 2014

(54) COMMUNICATION OVER BANDWIDTH-CONSTRAINED NETWORK

(75) Inventors: Gordon Li, San Diego, CA (US); Sherman (Xuemin) Chen, Rancho Sante Fe, CA (US)

(73) Assignee: Broadcom Corporation, Irvine, CA (US)

( * ) Notice: Subject to any disclaimer, the term of this patent is extended or adjusted under 35 U.S.C. 154(b) by 185 days.

(21) Appl. No.: 13/434,949

(22) Filed: Mar. 30, 2012

(65) Prior Publication Data

US 2013/0262622 A1    Oct. 3, 2013

(51) Int. Cl.
*G06F 15/16* (2006.01)
*G06F 12/00* (2006.01)

(52) U.S. Cl.
USPC .......................................... 709/250; 709/217

(58) Field of Classification Search
CPC ............ G06F 21/10; G06F 2221/0737; G06F 13/387; G06F 11/1604; G06F 11/1679; G06F 11/181; G11B 20/00086; G11B 20/00557; G11B 20/00768; G11B 20/00913; H04N 2005/91321; H04N 2005/91328; H04N 2005/91
USPC .................. 709/203, 217–218, 223–229, 250
See application file for complete search history.

(56) References Cited

U.S. PATENT DOCUMENTS

| | | | |
|---|---|---|---|
| 7,369,765 B2 * | 5/2008 | Aoki et al. ...................... 398/45 |
| 8,411,575 B2 * | 4/2013 | Karam ........................... 370/241 |
| 2002/0030907 A1 * | 3/2002 | Ikeda et al. ........................ 360/1 |
| 2011/0035772 A1 * | 2/2011 | Ramsdell et al. ................ 725/36 |
| 2012/0069131 A1 * | 3/2012 | Abelow ....................... 348/14.01 |
| 2012/0221889 A1 * | 8/2012 | Beilin et al. ..................... 714/12 |

FOREIGN PATENT DOCUMENTS

KR    10-2005-0066050 A    6/2005

OTHER PUBLICATIONS

Office Action for Korean Patent Application No. 10-2013-0034379, mailed on Apr. 28, 2014.
English-language Abstract for KR 10-2005-0066050 A, published Jun. 30, 2005, accessed from Korea Intellectual Property Rights Information Service.

* cited by examiner

*Primary Examiner* — Zarni Maung
(74) *Attorney, Agent, or Firm* — Sterne, Kessler, Goldstein & Fox P.L.L.C.

(57) ABSTRACT

An apparatus and a system are provided to proxy one or more media signals between at least one local client device and at least one remote client device. For instance, the apparatus can include a first network interface, a media dispatcher, and a second network interface. The first network interface can be configured to receive a single media signal of the one or more media signals from a local client device via a first communication network with an asymmetric communication protocol (e.g., Data Over Cable Service Interface Specification and Digital Subscriber Line). The media dispatcher can be configured to duplicate the single media signal into a plurality of duplicate media signals. Further, the second network interface can be configured to transmit the plurality of duplicate media signals to a plurality of remote client devices over a second communication network.

20 Claims, 10 Drawing Sheets

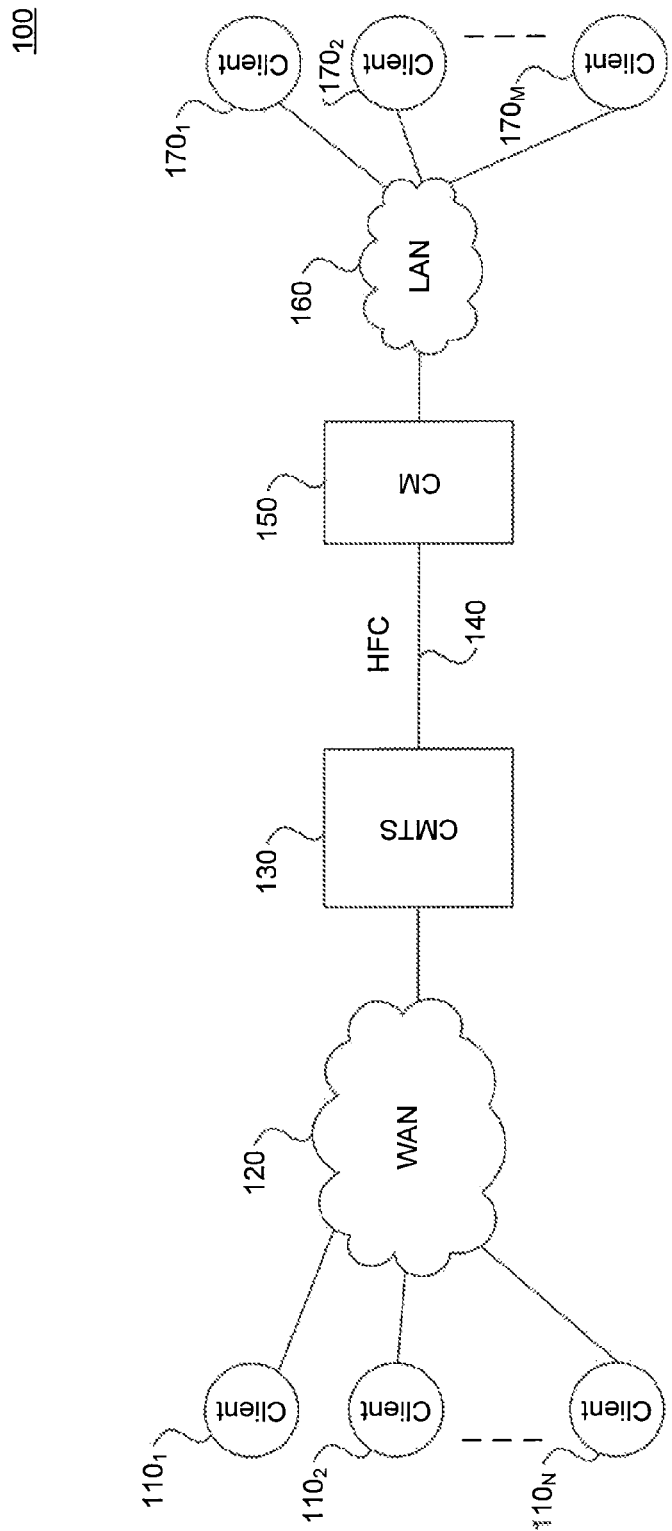
FIG. 1
(Conventional)

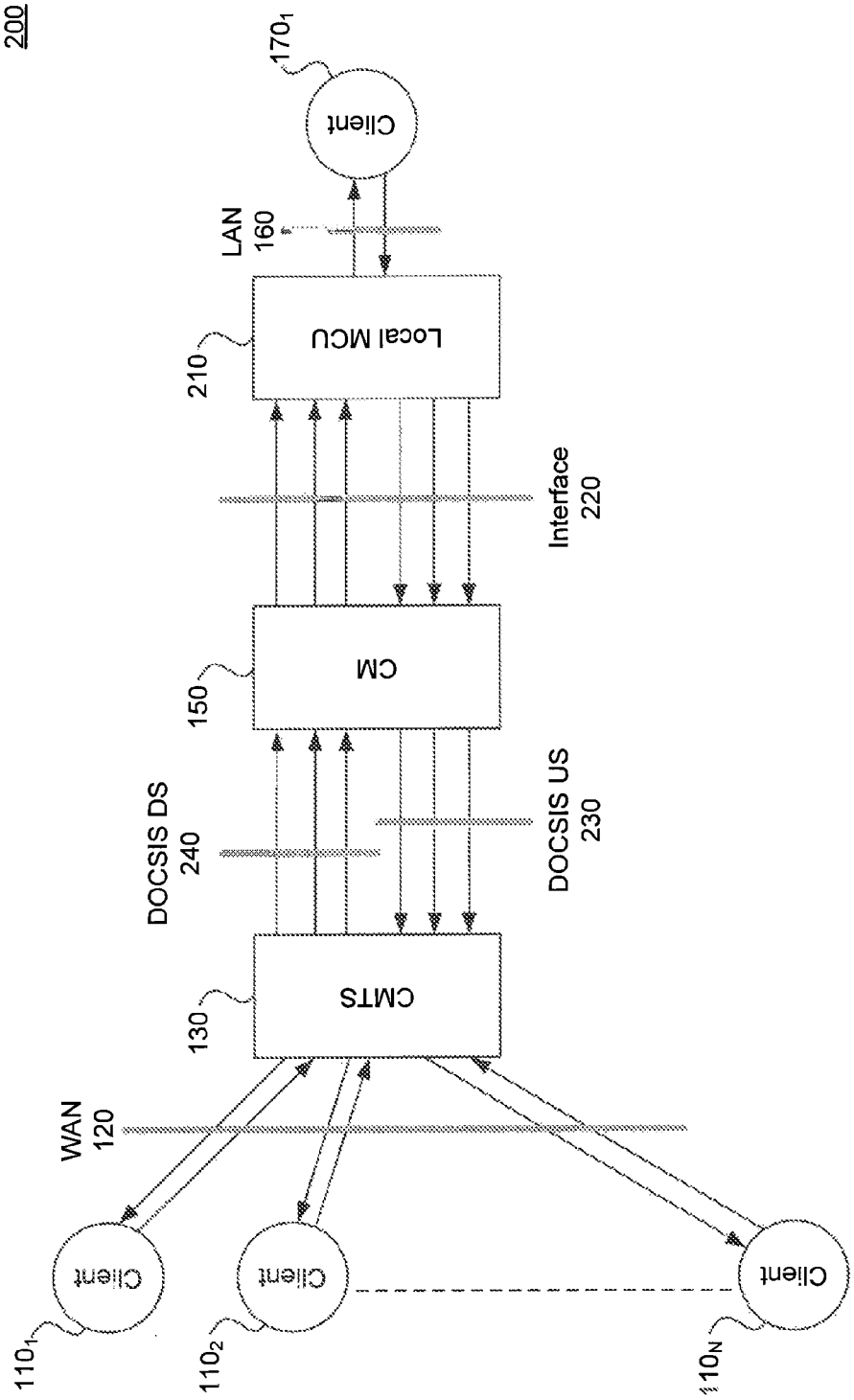
FIG. 2
(Conventional)

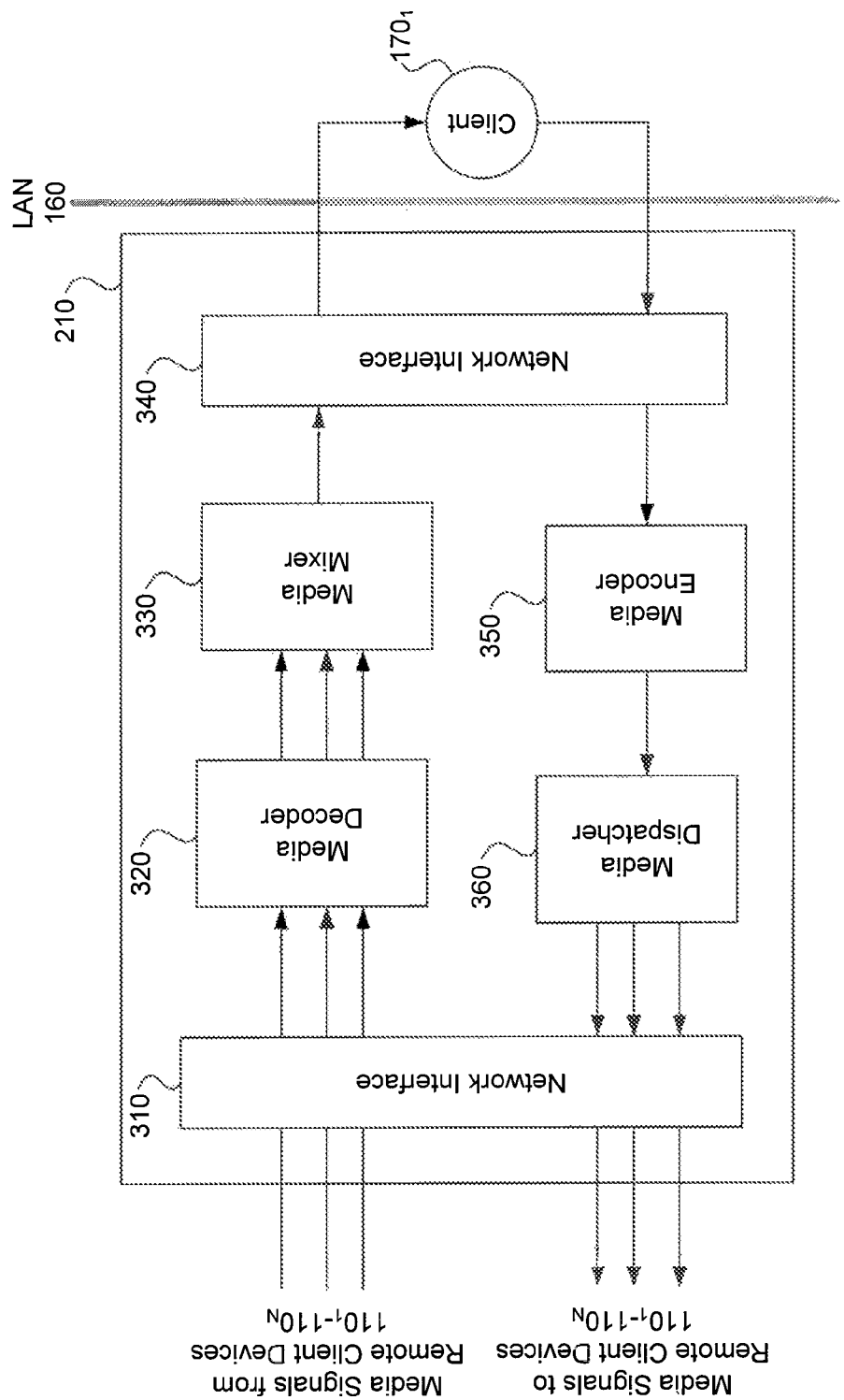
FIG. 3
(Conventional)

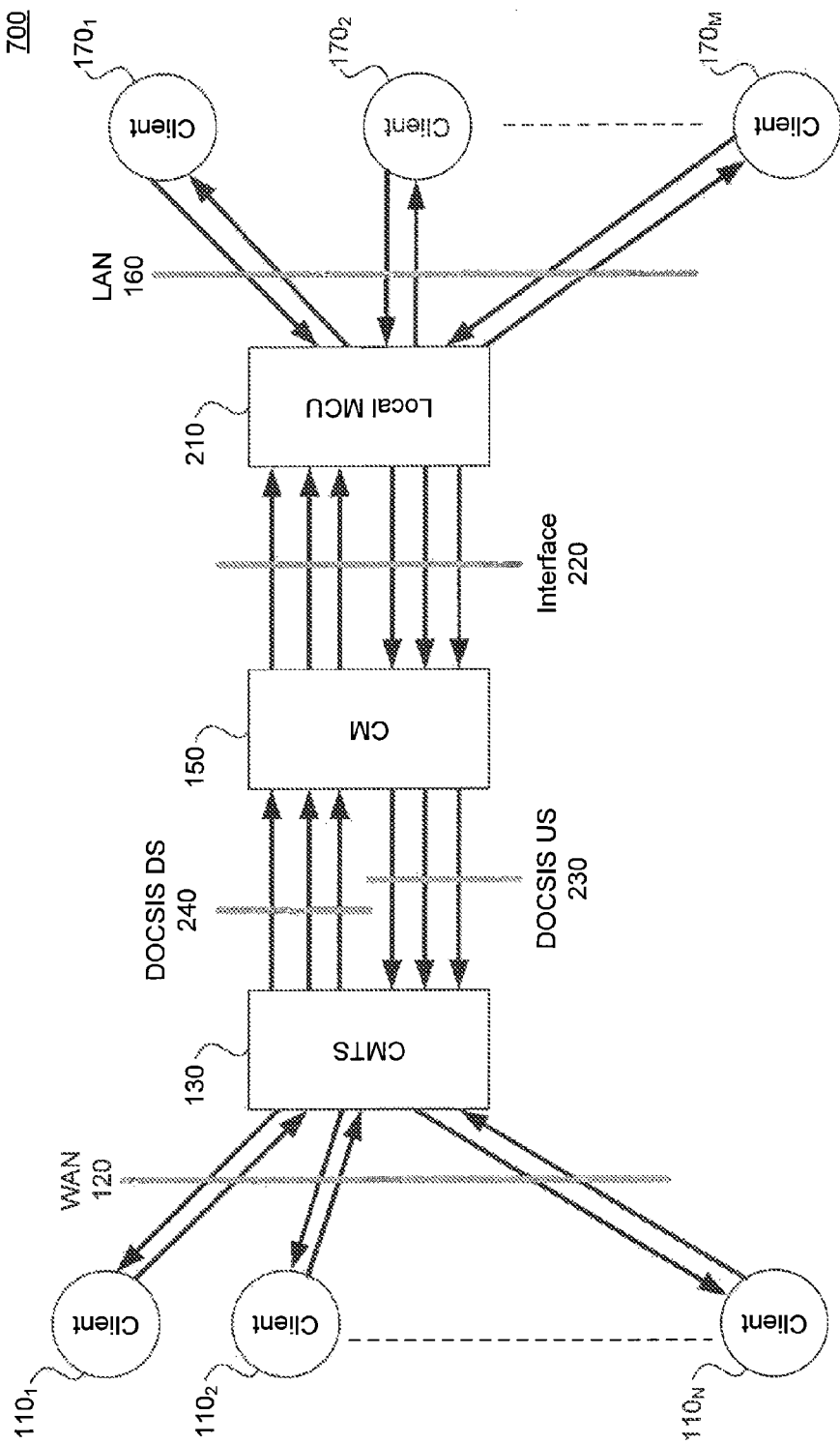
FIG. 7
(Conventional)

COMMUNICATION OVER BANDWIDTH-CONSTRAINED NETWORK

BACKGROUND

1. Field of the Invention

Embodiments of the present invention generally relate to the field of communication over bandwidth-constrained networks.

2. Background

Full-Band Capture (FBC) digital tuning is a downstream RF technology that converts an entire downstream analog signal to a digital signal, which allows client devices to simultaneously access the entire downstream digital signal. Client devices, as a result, can take advantage of applications with asymmetric bandwidth requirements such as, for example, music downloads, video-on-demand, and Internet Protocol (IP) television. FBC digital tuning can be implemented in various communication networks, including those with asymmetric communication protocols (e.g., downstream communication bandwidth differs from upstream communication bandwidth) such as, for example, Data Over Cable Service Interface Specification (DOCSIS) and Digital Subscriber Line (DSL).

By itself, FBC does not completely remove the bottleneck in the upstream bandwidth that exists in the DOCSIS system today and in the near future. Therefore, for real-time applications (e.g. video conferencing and VoIP) that have symmetric bandwidth requirements for both downstream and upstream, the bandwidth-related benefits of the FBC technology may not be fully utilized without additional techniques to workaround the upstream bottleneck in the FBC environment.

Further, for applications that have multiple local client devices in communication with multiple remote client devices over a communication network, FBC digital tuning may provide sufficient bandwidth to support the high-density communication in the downstream direction (e.g., communication from the multiple remote client devices to the multiple local client devices). However, communication in the upstream direction (e.g., communication from the multiple local client devices to the multiple remote client devices) may be a bottleneck in the high-density communication. This may result in a poor quality communication signal (e.g., in sound and video quality) between the local client devices and remote client devices.

Therefore, there is a need to adapt communication applications to bandwidth-constrained networks.

SUMMARY

Embodiments of the present disclosure include an apparatus for proxying a media signal between at least one local client device and at least one remote client device. The apparatus can include a first network interface, a media dispatcher, a second network interface, a media relay, and an authentication and billing module. The first network interface can be configured to receive a single media signal from a local client device via a first communication network with an asymmetric communication protocol and to transmit a first plurality of media signals from a plurality of remote client devices over a second communication network. The media dispatcher can be configured to duplicate the single media signal into a plurality of duplicate media signals. The second network interface can be configured to transmit the plurality of duplicate media signals to the plurality of remote client devices over the second communication network and to receive a second plurality of media signals from the plurality of remote client devices over the second communication network. The media relay can be configured to relay the first plurality of media signals from the second network interface to the first network interface. Further, the authentication and billing module can be configured to control session and billing services of a peer-to-peer communication session between a local client device and the plurality of remote client devices.

Embodiments of the present disclosure also include a system for proxying a media signal between at least one local client device and at least one remote client device. The system can include a cable modem, a cable modem termination system (CMTS), a media proxy, and a local media control unit (MCU). The CMTS can be configured to transmit a plurality of media signals to the cable modem over a first communication network with an asymmetric communication protocol and to receive a single media signal from a local client device over the first communication network. The media proxy is configured to: receive the single media signal from the CMTS via a second communication network; transmit a plurality of duplicate media signals to a plurality of remote client devices over the second communication network; receive a second plurality of media signals from the plurality of remote client devices over the second communication network; and, transmit the second plurality of media signals to the CMTS over the second communication network. In one embodiment, the media proxy can be implemented in a cloud-computing environment. Further, the local MCU is configured to transmit the single media signal from the local client device to the cable modem over a local area network.

Embodiments of the present disclosure also include an apparatus for proxying one or more media signals between a plurality of local client devices and a plurality of remote client devices. The apparatus can include a first network interface, a rate controller and media transcoder, a second network interface, and a service provisioning module. The first network interface is configured to receive a plurality of media signals over a first communication network, where the plurality of media signals is encoded into at least one codec format. The rate controller and media transcoder is configured to transcode one or more of the plurality of media signals into a different codec format based on channel and processing capabilities associated with one or more local client devices and one or more control messages regarding at least one of bandwidth usage information of the first communication network, the at least one codec format, or a combination thereof. The second network interface is configured to transmit the one or more transcoded plurality of media signals to a respective plurality of remote client devices over a second communication network. Further, the service module device is configured to provision one or more service levels to the one or more local client devices.

Embodiments of the present disclosure further include a system for proxying one or more media signals between a plurality of local client devices and a plurality of remote client devices. The system can include a cable modem, a cable modem termination system (CMTS), an adaptive media rate controller, and a local media control unit (MCU). The CMTS is configured to transfer a plurality of media signals to and from the cable modem over a first communication network, where the plurality of media signals is encoded into at least one codec format. The adaptive media rate controller is configured to transcode one or more of the plurality of media signals into a different codec format based on channel and processing capabilities associated with one or more local client devices and one or more control messages regarding at least one bandwidth usage information of the first communication network, the at least one codec format, or a combination thereof. In one embodiment, the adaptive media rate controller can be implemented in a cloud-computing environment. Further, the local MCU is configured to transfer the plurality of media signals encoded into the at least one codec format from a local client device to the cable modem over a local area network.

Further features and advantages of the disclosure, as well as the structure and operation of various embodiments of the present disclosure, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the relevant art to make and use the disclosure.

FIG. 1 is an illustration of a conventional communication network that implements a Data Over Cable Service Interface Specification communication protocol between a cable modem termination system and a cable modem.

FIG. 2 is an illustration of a conventional communication network with one local client device in communication with a plurality of remote client devices over a Data Over Cable Service Interface Specification communication network.

FIG. 3 is an illustration of a conventional local media control unit.

FIG. 7 is an illustration of a conventional communication network with a plurality of local client devices in communication with a plurality of remote client devices over a Data Over Cable Service Interface Specification communication network.

Figure 4:
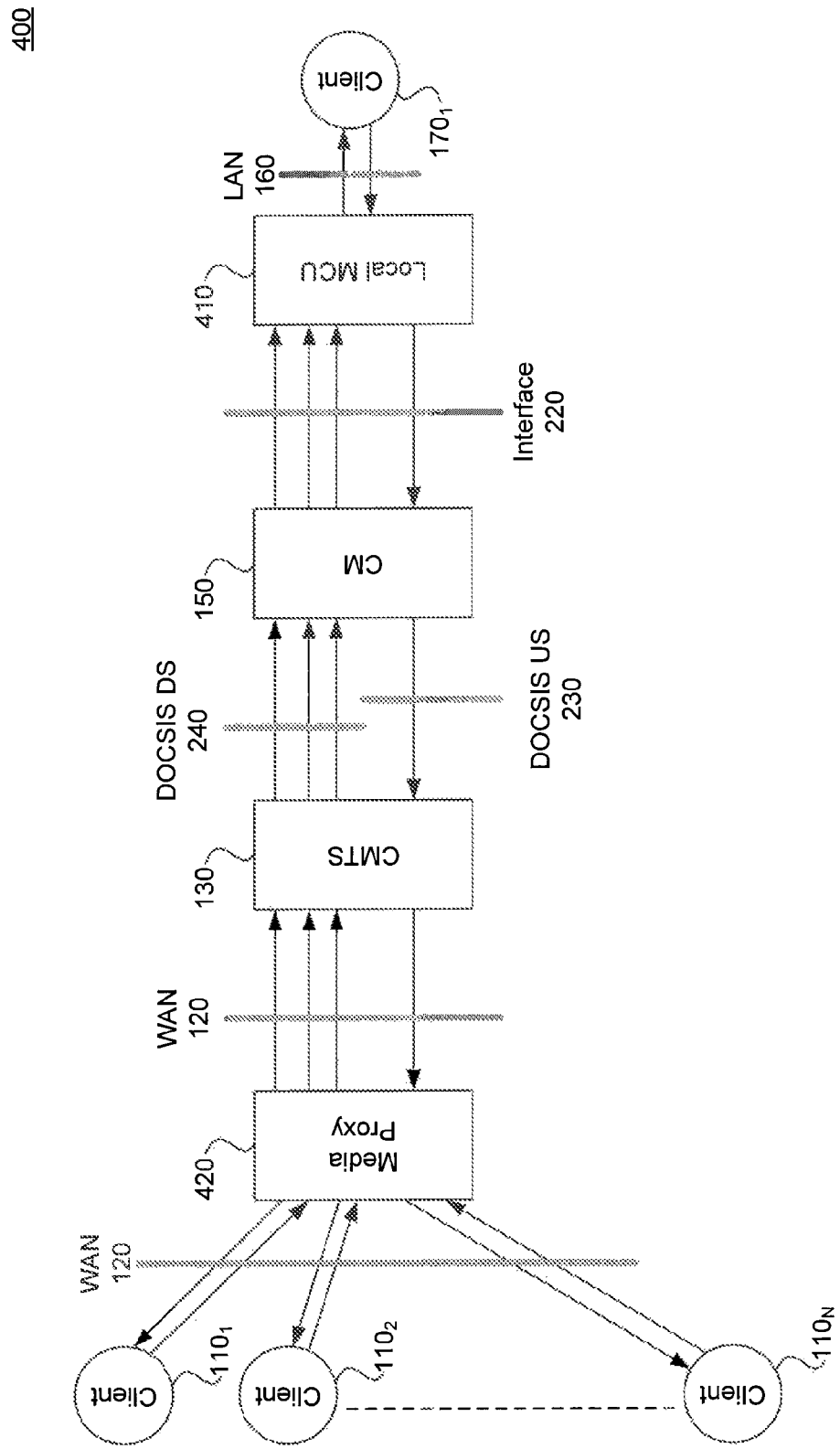
FIG. 4 is an illustration of an embodiment of a communication system that accommodates for upstream bandwidth restrictions due to a communication network with an asymmetric communication protocol.

Embodiments of the present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description refers to the accompanying drawings that illustrate exemplary embodiments consistent with this disclosure. Other embodiments are possible, and modifications can be made to the embodiments within the spirit and scope of the present disclosure. Therefore, the detailed description is not meant to limit the present disclosure. Further, the scope of the present disclosure is defined by the appended claims.

It would be apparent to a person skilled in the relevant art that the present disclosure, as described below, can be implemented in many different embodiments of software, hardware, firmware, and/or the entities illustrated in the figures. Any actual software code with the specialized control of hardware to implement embodiments of the present disclosure is not meant to be limiting. Thus, the operational behavior of embodiments of the present disclosure will be described with the understanding that modifications and variations of the embodiments are possible, given the level of detail presented herein.

Further, for purposes of explanation, specific details are set forth in order to provide a thorough understanding of embodiments of the present disclosure. It will be evident, however, to a person skilled in the relevant art that embodiments of the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

Embodiments of the present disclosure provide apparatuses and systems for communication over a bandwidth-constrained network. Communication applications such, for example but without limitation, video conferencing and Voice over IP can be used to provide communication between at least one local client device and at least one remote client device. Further, the communication between the at least one client device and the at least one remote client device can occur over a network with an asymmetric communication protocol such as, for example and without limitation, DOCSIS and DSL. As would be understood by a person of ordinary skill in the art, DOCSIS and DSL are communication protocols with asymmetric bandwidth in the upstream and downstream directions (e.g., downstream communication bandwidth differs from upstream communication bandwidth).

For exemplary purposes, embodiments of the present disclosure will be described below in the context of a DOCSIS communication network. Further, embodiments of the present invention will be described below in the context of two examples: a 1:N multimedia call, where one local client device is in communication with N remote client devices (N is an integer with a value of two or more); and, M:N multimedia calls, where M local client devices are in communication with N remote client devices (M and N are both integers, each with a value of two or more). For exemplary purposes, the multimedia call can have both audio and video content, which are collectively referred to herein as "media content" or "media signal." Based on the description herein, a person of ordinary skill in the art will recognize that embodiments of the present disclosure can apply to other types of communication networks and to other types of communication applications.

I. DOCSIS COMMUNICATION NETWORK

FIG. 1 is an illustration of a conventional communication network 100 that implements a DOCSIS communication protocol between a cable modem termination system (CMTS) 130 and a cable modem 150. Communication network 100 includes remote client devices $110_1$-$110_N$, a Wide Area Network (WAN) 120, CMTS 130, a hybrid fiber-coax (HFC) network 140, cable modem 150, a local access network (LAN) 160, and local client devices $170_1$-$170_M$. Remote client devices $110_1$-$110_N$ and local client devices $170_1$-$170_M$ are electronic devices in communication with one another in communication network 100. Remote client devices $110_1$-$110_N$ and local client devices $170_1$-$170_M$ can be, for example and without limitation, desktop computers, mobile phones, laptops, personal digital assistants, video telephones, or a combination thereof.

WAN 120 is a telecommunication network that covers a broad area, as would be understood by a person of ordinary skill in the art. WAN 120 can a packet-switched network (e.g., internet) that transfers IP packets to CMTS 130. CMTS 130 communicates with cable modem 150 via HFC network 140 in accordance with the DOCSIS communication protocol. As would be understood by a person of ordinary skill in the art, the DOCSIS communication protocol has asymmetric bandwidth in the upstream and downstream directions (e.g., downstream communication bandwidth differs from upstream communication bandwidth). For example, the downstream bandwidth is typically larger than the upstream bandwidth. CMTS 130 can manage the upstream and downstream transfer of data to and from cable modem 150. For instance, CMTS 130 can monitor the available bandwidth in the upstream and downstream directions of the DOCSIS communication network. Cable modem 150 can provide broadband access to local client devices $170_1$-$170_M$ via LAN 160, which is known to a person of ordinary skill in the art.

The overall frequency band of HFC network 140 (e.g., DOCSIS communication network) can be divided into an upstream subband and a downstream subband, in which the upstream subband for the DOCSIS network is substantially narrower than the downstream subband for the DOCSIS network. For instance, the upstream subband can reside between 5 MHz and 65 MHz, whereas the downstream subband can reside between 111 MHz and 862 MHz. The upstream and downstream subbands can be farther divided into multiple frequency channels, in which the upstream frequency channels are typically much narrower than the downstream frequency channels.

The above-described asymmetry between downstream and upstream communication bandwidths is a characteristic of the DOCSIS communication protocol. Embodiments of the present invention, as discussed in Sections II and III below, provide apparatuses and systems for communication over a bandwidth-constrained network. Embodiments of the present invention can be used, for example and without limitation, to adapt symmetric bandwidth applications (e.g., video conferencing and Voice over IP) to communication networks with asymmetric communication protocols and/or bandwidth allocation (e.g., DOCSIS communication network 100 of FIG. 1).

II. 1:N MULTIMEDIA CALL

In this example, embodiments of the present disclosure are described in the context of one local client device in communication with a plurality of remote client devices over a DOCSIS communication network. FIG. 2 is an illustration of a conventional communication network 200 with remote client devices $110_1$-$110_N$, WAN 120, CMTS 130, cable modem 150, LAN 160, local client device $170_1$, a local media control unit (MCU) 210, and an interface 220. Remote client devices $110_1$-$110_N$, WAN 120, CMTS 130, cable modem 150, LAN 160, and local client device $170_1$ are described above with respect to FIG. 1. An interface 220 provides a communication link between cable modem 150 and local MCU 210, in which interface 220 can be, for example and without limitation, an Ethernet connection or, if cable modem 150 and local MCU 210 are integrated in the same device, an internal communication interface. Downstream and upstream communication over an HFC network (e.g., HFC network 140 of FIG. 1) are depicted as DOCSIS DS 240 and DOCSIS US 230, respectively.

Local MCU 210 serves as a media gateway between local client device $170_1$ and cable modem 150 via interface 220. FIG. 3 is an illustration of a conventional local MCU 210. Local MCU 210 includes a first network interface 310, a media decoder 320, a media mixer 330, a second network interface 340, a media encoder 350, and a media dispatcher 360.

Second network interface 340 serves as an interface to local client device $170_1$, in which second network interface 340 can transfer a media signal to and from local client device $170_1$. Media encoder 350 encodes the content of the media signal from local client device $170_1$ into a data compressible format. Media encoder 350 can include a video codec such as, for example and without limitation, MPEG-4, H.264, or an On2 video codec. Media dispatcher 360 duplicates the encoded media signal from media encoder 350 such that each of remote client devices $110_1$-$110_N$ receives a duplicate copy of the media signal from media encoder 350. That is, for N number of remote client devices, media dispatcher 350 provides N number of copies of the encoded media signal to first network interface 310.

First network interface 310 serves as an interface to cable modem 150 (of FIG. 2). In the upstream direction (e.g., media communication from local client device $170_1$ to remote client devices $110_1$-$110_N$), first network interface 310 transfers duplicates of encoded media signals to cable modem 150. In the downstream direction (e.g., media communication from remote client devices $110_1$-$110_N$ to local client device $170_1$), first network interface 310 transfers an encoded media signal from each of remote client devices $110_1$-$110_N$ to media decoder 320. Media signals from remote client devices $110_1$-$110_N$ are typically encoded using a codec (e.g., MPEG-4, H.264, or an On2 video codec).

Media decoder 320 decodes media signals received from remote client devices $110_1$-$110_N$ and transfers the decoded media signals to media mixer 330. Media mixer 330 combines the decoded media content transmitted from remote client devices $110_1$-$110_N$ such that a user of local client device $170_1$ can hear and view the respective users of remote client devices $110_1$-$110_N$ simultaneously. Media mixer 330 provides the combined media signal from remote client devices $110_1$-$110_N$ to local client device $170_1$ via second network interface 340.

In a conventional peer-to-peer approach, as discussed above with respect to FIGS. 2 and 3, local MCU 210 receives N separate downstream media signals and transmits N separate upstream media signals via DOCSIS DS 240 and DOCSIS US 230 of FIG. 2, respectively. For both downstream and upstream directions of a particular communication session, the media signals typically require the same amount of bandwidth. For downstream technologies (e.g., FBC digital tuning) that operate within an asymmetric communication protocol between CMTS 130 and cable modem 150 (e.g., DOCSIS communication protocol), a large number of downstream media signals may be supported simultaneously. However, the same number of upstream media signals may not be supported by the asymmetric communication protocol due to upstream bandwidth restrictions. These upstream bandwidth restrictions are inherent in broadband access systems such as, for example and without limitation, DOCSIS communication systems.

Embodiments of the present disclosure provide a communication system that accommodates for upstream bandwidth restrictions in communication systems with asymmetric communication protocols. FIG. 4 is an illustration of an embodiment of a communication system 400 that accommodates for upstream bandwidth restrictions due to an asymmetric communication protocol. Communication system 400 includes remote client devices $110_1$-$110_N$, WAN 120, CMTS 130, DOCSIS US 230, DOCSIS DS 240, cable modem 150, interface 220, LAN 160, local client device $170_1$, a local MCU 410, and a media proxy 420. Remote client devices $110_1$-$110_N$, WAN 120, CMTS 130, cable modem 150, LAN 160, and local client device $170_1$ are described above with respect to FIG. 1. Interface 220, DOCSIS US 230, and DOCSIS DS 240 are described above with respect to FIG. 2.

Figure 5:
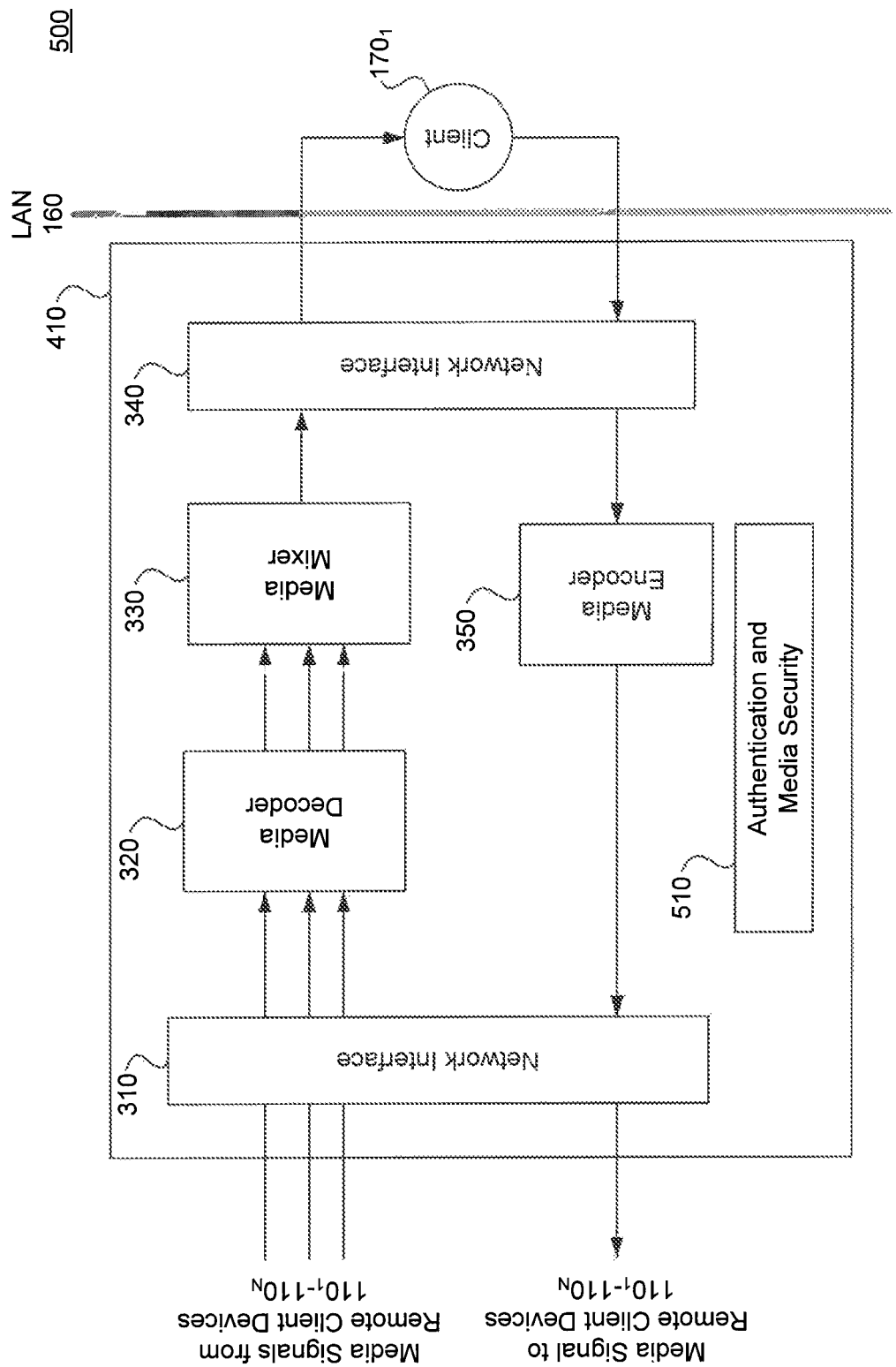
FIG. 5 is an illustration of an embodiment of a local media control unit.

FIG. 5 is an illustration of an embodiment of local MCU 410, which serves as a gateway between local client device $170_1$ and cable modem 150 via interface 220. Local MCU 410 includes first network interface 310, media decoder 320, media mixer 330, second network interface 340, media encoder 350, and an authentication and media security module 510. First network interface 310, media decoder 320, media mixer 330, second network interface 340, and media encoder 350 are described above with respect to FIG. 3. In an embodiment, authentication and media security module 510 authenticates local MCU 410 to media proxy 420 to establish a communication link and support functions between the two devices. Authentication and media security module 510 also handles key exchange and media encryption/decryption functions for local MCU 410, according to an embodiment of the present invention.

The processing of downstream media signals for local MCU 410 is similar to the downstream processing of local MCU 210 of FIG. 2. That is, local MCU 410 receives N separate downstream media signals from remote client devices $110_1$-$110_N$, decodes each of the media signals, mixes the decoded media signals, and provides the mixed media signal to local client device $170_1$ via second network interface 340.

The processing of upstream media signals for local MCU 410, however, is different from the upstream processing of local MCU 210. In an embodiment, the encoded media signal from media encoder 350 of FIG. 5 is provided to first network interface 310 of FIG. 5. Here, unlike the upstream processing of local MCU 210 of FIG. 2, the encoded media signal is not duplicated N times. Rather, a single encoded media signal from first network interface 310 is provided to cable modem 150 via interface 220 (e.g., indicated by a single arrow output from local network interface 310 in FIG. 5 and the single arrow output from local MCU 410 to cable modem 150 in FIG. 4). In reference to FIG. 4, the single encoded media signal is transferred from cable modem 150 to CMTS 130 via DOCSIS US 230 (e.g., indicated by a single arrow from cable modem 150 to CMTS 130 in FIG. 4).

Media proxy 420 receives the single encoded media signal from CMTS 130 and duplicates the encoded media signal N times, in which a duplicate media signal is transferred to each of remote client devices $110_1$-$110_N$. In an embodiment, media proxy 420 can be implemented in a cloud-computing environment. For instance, media proxy 420 can be implemented in a shared computing environment that provides, among other things, computation, software applications, data access, data management, and storage resources without requiring cloud users to know the location and other details of the computing infrastructure. Cloud-computing environments are known to a person of ordinary skill in the art.

Figure 6:
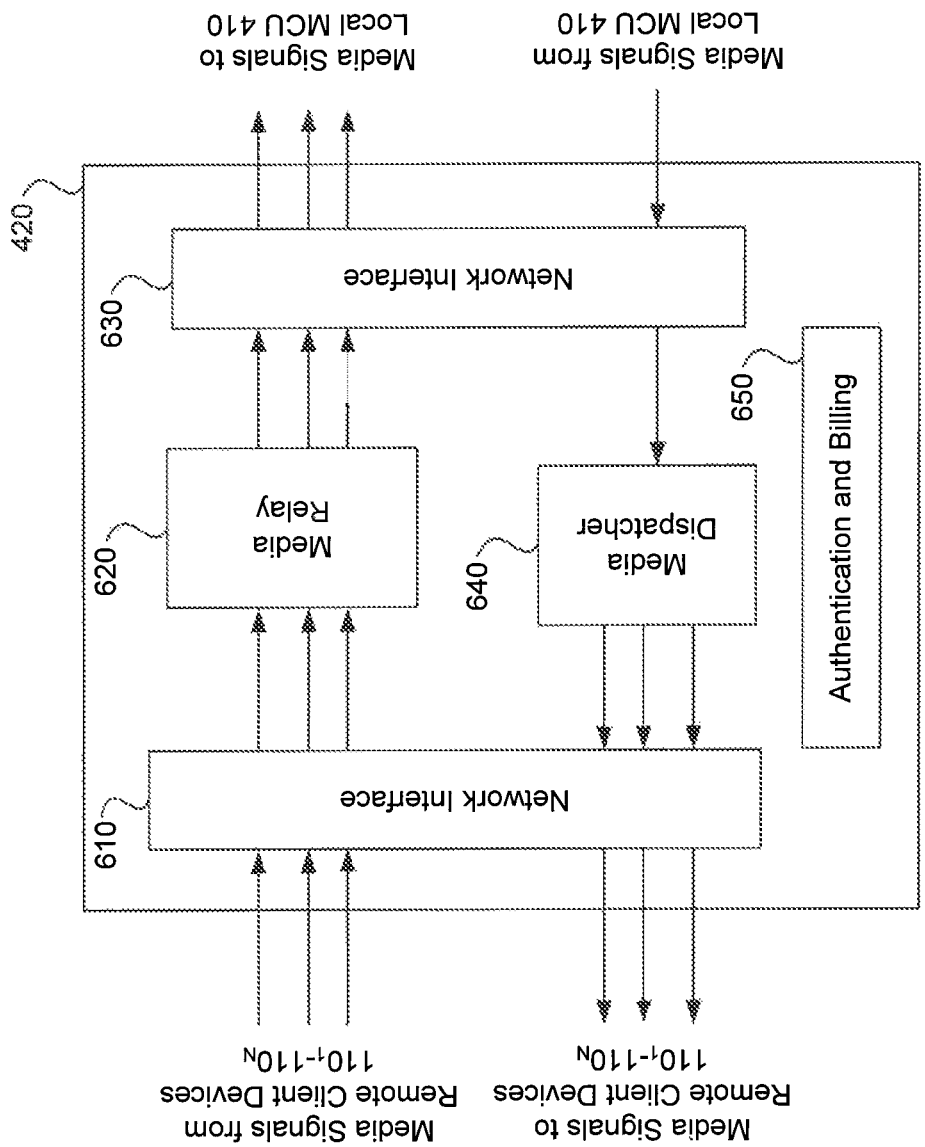
FIG. 6 is an illustration of an embodiment of a media proxy.

FIG. 6 is an illustration of an embodiment of media proxy 420. Media proxy 420 includes a first network interface 610, a media relay 620, a second network interface 630, a media dispatcher 640, and an authentication and billing module 650. First network interface 610 serves as an interface between media proxy 420 and remote client devices $110_1$-$110_N$, in which first network device 610 transfers media signals to and from remote client devices $110_1$-$110_N$.

Media relay 620 directs media signals from remote client devices $110_1$-$110_N$ to local client device $170_1$ and maintains media connectivity between the devices. Media relay 620 can direct (or relay) the media signals from remote client devices $110_1$-$110_N$ to local client device $170_1$ based on channel and processing capabilities associated with local client device $170_1$. In the downstream direction, media relay 620 can assess the bandwidth of one or more downstream channels and, based on this assessment, transcode media signals from remote client devices $110_1$-$110_N$ to a format appropriate for one or more of the downstream channel's bandwidth capability. For instance, if one or more of the media signals from remote client devices $110_1$-$110_N$ are in a high-definition (HD) data format that would prohibitively consume one or more of the downstream channels' bandwidths, then media relay 620 can transcode the HD signal to a data format with a lower resolution to accommodate a respective downstream channel's bandwidth capability.

Media relay 620 can also assess the processing capabilities associated with local client device $170_1$ and transcode one or more media signals from remote client devices $110_1$-$110_N$ to a format compatible with local client device $170_1$. For instance, if one or more media signals from remote client devices $110_1$-$110_N$ contain both audio and video content but local client device $170_1$ can only support audio content, then media relay 620 can filter one or more of the media signals from remote client devices $110_1$-$110_N$ such that only the audio content of a respective media signal is transmitted to local client device $170_1$. As a result, not only is a compatible media signal transmitted to local client device $170_1$, but also less channel bandwidth is consumed in the downstream direction. In another example, in the downstream direction, media relay 620 can transcode one or more of the media signals from remote client devices $110_1$-$110_N$ to a data format that is compatible with local client device $170_1$.

Second network interface 630 serves as an interface between media proxy 420 and CMTS 130 of FIG. 4. In an embodiment, authentication and billing module 650 authenticates media proxy 420 to local MCU 410 to establish a communication link and support functions between the two devices. Authentication and billing module 650 also handles session and billing services of the peer-to-peer sessions processed by media proxy 420, according to an embodiment of the present invention. Authentication and billing module 650 can collect billing statistics for the multimedia call between local client device $170_1$ and remote client devices $110_1$-$110_N$.

In an embodiment, media dispatcher 640 duplicates the single encoded media signal (received from CMTS 130) N times, in which a duplicate media signal is transferred to each of remote client devices $110_1$-$110_N$ via first network interface 610. In contrast to media dispatcher 360 of FIG. 3, media dispatcher 640 of FIG. 6 does not reside in the local MCU. Rather, media dispatcher 640 resides in media proxy 420, which is upstream of the e DOCSIS communication network (e.g., DOCSIS US 230 and DOCSIS DS 240) and communicates with the CMTS 130 via the WAN 120. That is, media dispatcher 640 is in the WAN portion of communication system 400. A benefit, among others, of having media dispatcher 640 upstream of the DOCSIS communication network is that the duplication function of media dispatcher 640 does not occur in the bandwidth-constrained portion of communication system 400 (e.g., DOCSIS US 230). That is, to accommodate for the upstream bandwidth restrictions in the DOCSIS communication link between cable modem 150 and CMTS 150 of FIG. 4, a single encoded media signal (from local client device $170_1$) is transferred over DOCSIS US 230 rather than N duplicates of the encoded media signal. As a result, the multimedia call between local client device $170_1$ and remote client devices $110_1$-$110_N$ is not constrained (e.g., sacrifice in the sound and video quality of the media signal) by the upstream bandwidth restrictions in broadband access systems such as, for example and without limitation, DOCSIS communication systems.

III. M:N MULTIMEDIA CALLS

In this example, embodiments of the present invention are described in the context of a plurality of local client devices in communication with a plurality of remote client devices over a DOCSIS communication network. FIG. 7 is an illustration of a conventional DOCSIS communication network 700, which includes remote client devices $110_1$-$110_N$, WAN 120, CMTS 130, cable modem 150, LAN 160, local client devices $170_1$-$170_M$, DOCSIS US 230, DOCSIS DS 240, interface 220, and local MCU 210. Remote client devices $110_1$-$110_N$, WAN 120, CMTS 130, cable modem 150, LAN 160, local client devices $170_1$-$170_M$ are described above with respect to FIG. 1. Local MCU 210, interface 220, DOCSIS US 230, and DOCSIS DS 240 are described above with respect to FIG. 2.

In communication system 700, local MCU 210 receives N separate downstream media signals from remote client devices $110_1$-$110_N$ and transmits M separate upstream media signal from local client devices $170_1$-$170_M$. For both downstream and upstream directions of a particular communication session, the media signals typically require the same amount of bandwidth. For downstream technologies (e.g., FBC digital tuning) that operate within an asymmetric communication protocol between CMTS 130 and cable modem 150 (e.g., DOCSIS communication protocol), a large number of downstream media signals may be supported simultaneously. However, the same number of upstream media signals may not be supported by the asymmetric communication protocol due to upstream bandwidth restrictions. These upstream bandwidth restrictions are inherent in broadband access systems such as, for example and without limitation, DOCSIS communication systems.

Embodiments of the present invention provide a communication system that accommodates for upstream bandwidth restrictions in communication systems with asymmetric communication protocols. However, based on the description herein, a person of ordinary skill in the art will recognize that embodiments of the present invention is not limited to communication systems with upstream bandwidth restrictions. Embodiments of the present invention can also be applied to communication systems with downstream bandwidth restrictions.

Figure 8:
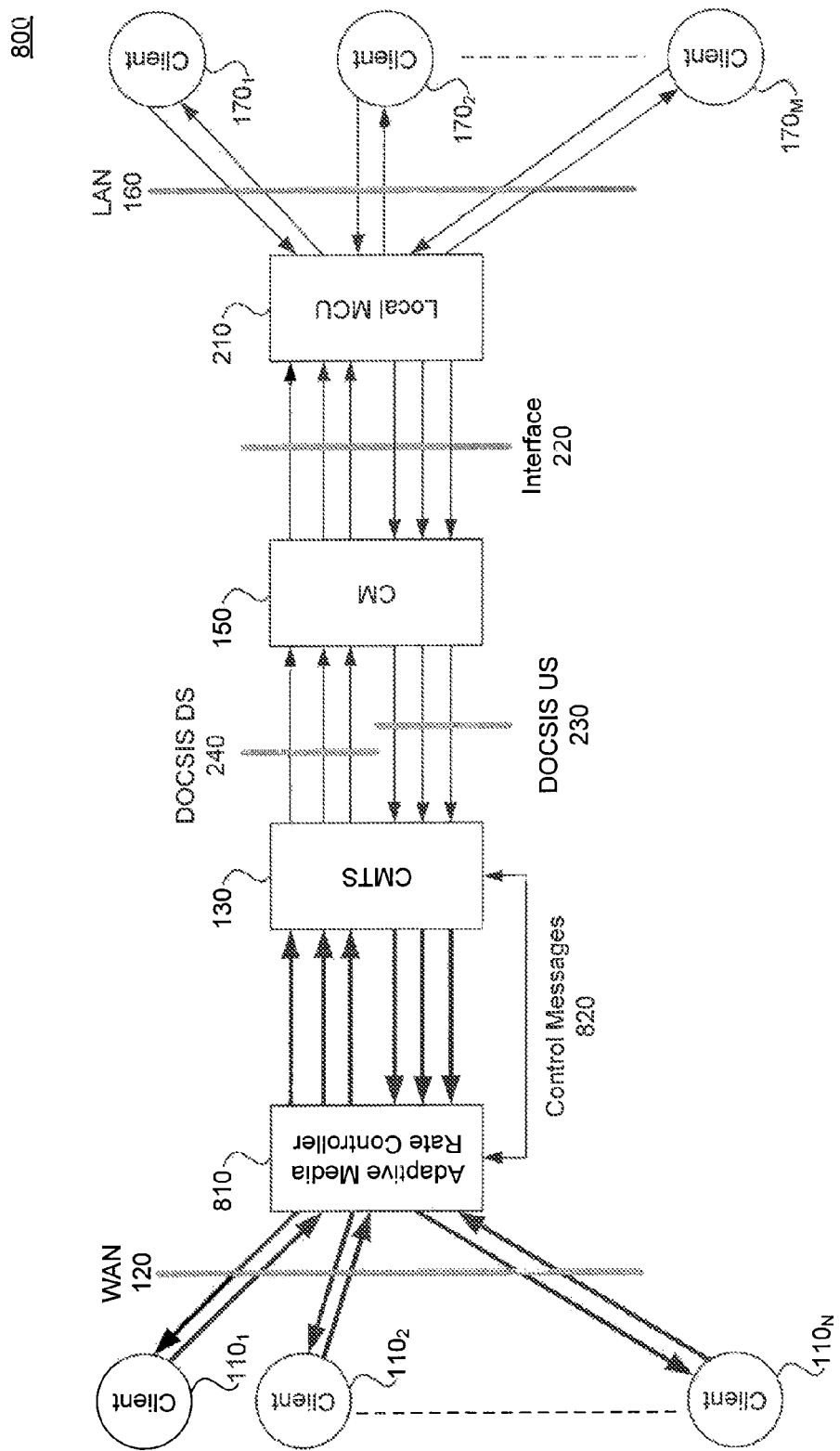
FIG. 8 is an illustration of an illustration of an embodiment of a communication system that accommodates for bandwidth restrictions in a communication system.

FIG. 8 is an illustration of an embodiment of a communication system 800 that accommodates for bandwidth restrictions in a communication system. Communication system 800 includes remote client devices $110_1$-$110_N$, WAN 120, CMTS 130, cable modem 150, LAN 160, local client devices $170_1$-$170_M$, DOCSIS US 230, DOCSIS DS 240, interface 220, local MCU 210, and an adaptive media rate controller 810. Remote client devices $110_1$-$110_N$, WAN 120, CMTS 130, cable modem 150, LAN 160, and local client devices $170_1$-$170_M$ are described above with respect to FIG. 1. DOCSIS US 230, DOCSIS DS 240, interface 220, and local MCU 210 are described above with respect to FIG. 2.

Adaptive media rate controller 810 serves as an interface between CMTS 130 and remote client devices $110_1$-$110_N$. In an embodiment, adaptive media rate controller 810 can be implemented in a cloud-computing environment. For instance, adaptive media rate controller 810 can be implemented in a shared computing environment that provides, among other things, computation, software applications, data access, data management, and storage resources without requiring cloud users to know the location and other details of the computing infrastructure. Cloud-computing environments are known to a person of ordinary skill in the art.

In an embodiment, adaptive media rate controller 810 transfers media signals to and from remote client devices $110_1$-$110_N$ via WAN 120. Adaptive media rate controller 810 is in communication with CMTS 130 to obtain bandwidth usage information for downstream and upstream channels of DOCSIS DS 240 and DOCSIS US 230, respectively, according to an embodiment of the present disclosure. The bandwidth usage information for the downstream and upstream channels is communicated from CMTS 130 to adaptive media rate controller 810 via one or more control messages 820. In accordance with the DOCSIS protocol, the bandwidth usage information for the downstream and upstream channels is also communicated from CMTS 130 to cable modem 150, as would be understood by a person of ordinary skill in the art.

Figure 9:
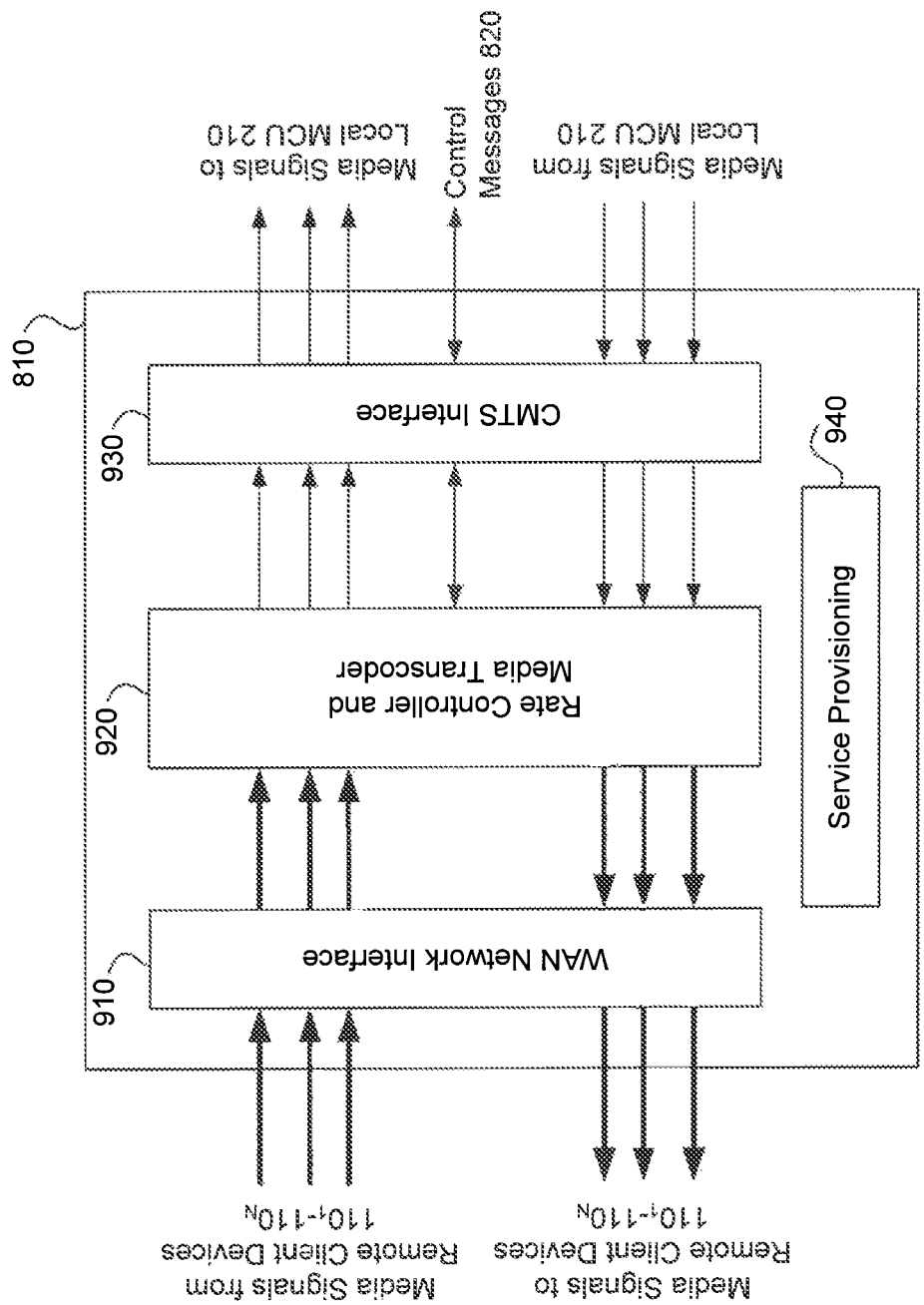
FIG. 9 is an illustration of an embodiment of an adaptive media rate controller.

FIG. 9 is an illustration of an embodiment of adaptive media rate controller 810. Adaptive media rate controller 810 includes a WAN network interface 910, a rate controller and media transcoder 920, a CMTS interface 930, and a service provisioning module 940. WAN network interface 910 serves as an interface to remote client devices $110_1$-$110_N$, in which WAN network interface 910 can transfer media signals to and from remote client devices $110_1$-$110_N$ via WAN 120. CMTS interface 930 serves as an interface to CMTS 130, in which CMTS interface 930 can transfer encoded media signals and one or more control messages 820 to rate controller and media transcoder 920, according to an embodiment of the present disclosure.

Based on the bandwidth usage information from CMTS 130 (via one or more control messages 820) and/or channel and processing capabilities associated with local client devices $170_1$-$170_M$, rate controller and media transcoder 920 adapts one more data rates associated with the media signals from remote client devices $110_1$-$110_N$ and local client devices $170_1$-$170_M$, according to an embodiment of the present disclosure. In the downstream direction, rate controller and media transcoder 920 can assess the bandwidth of one or more downstream channels and, based on this assessment, transcode media signals from remote client devices $110_1$-$110_N$ to a format appropriate for one or more of the downstream channel's bandwidth capability. For instance, if one or more of the media signals from remote client devices $110_1$-$110_N$ are in a high-definition (HD) data format that would prohibitively consume one or more of the downstream channels' bandwidths, then rate controller and media transcoder 920 can transcode the HD signal to a data format with a lower resolution to accommodate a respective downstream channel's bandwidth capability.

Rate controller and media transcoder 920 can also assess the processing capabilities associated with local client devices $170_1$-$170_M$ and transcode one or more media signals from remote client devices $110_1$-$110_N$ to a format compatible with one or more local client devices $170_1$-$170_M$. For instance, if one or more media signals from remote client devices $110_1$-$110_N$ contain both audio and video content but one or more local client devices $170_1$-$170_M$ can only support audio content, then rate controller and media transcoder 920 can filter one or more of the media signals from remote client devices $110_1$-$110_N$ such that only the audio content of a respective media signal is transmitted to one or more of local client devices $170_1$-$170_M$. As a result, not only is a compatible media signal transmitted to one or more of local client devices $170_1$-$170_M$, but also less channel bandwidth is consumed in the downstream direction. In another example, in the downstream direction, rate controller and media transcoder 920 can transcode one or more of the media signals from remote client devices $110_1$-$110_N$ to a data format that is compatible with one or more local client devices $170_1$-$170_M$.

In the downstream direction (e.g., media communication from remote client devices $110_1$-$110_N$ to local client devices $170_1$-$170_M$), rate controller and media transcoder 920 changes the data rates associated with the media signals of remote client devices $110_1$-$110_N$ by transcoding the media signals between codec formats of different compression efficiency. As would be understood by a person of ordinary skill in the art, different codec formats (e.g., MPEG-4, H.264, or an On2 video codec) can have different bitrates, where the bitrate for a particular codec format can be based on signal quality (e.g., video quality) and compression efficiency. For instance, a codec format with a high signal quality and low compression efficiency can have a higher bitrate than a codec format with a low signal quality and a high compression efficiency. A codec format with a higher bitrate will require more bandwidth than a codec format with a lower bitrate, as would be understood by a person of ordinary skill in the art.

If bandwidth is constrained in the downstream direction, rate controller and media transcoder 920 can transcode one or more media signals from remote client devices $110_1$-$110_N$ to a codec format with a lower bitrate that will be more acceptable to the constrained medium, according to an embodiment of the present disclosure. Also, in an embodiment, rate controller and media transcoder 920 can transcode one or more media signals from remote client devices $110_1$-$110_N$ into different codec formats. Further, rate controller and media transcoder 920 can transcode the media signals from remote client devices $110_1$-$110_N$ in a dynamic manner, according to an embodiment of the present disclosure. For instance, if bandwidth in the downstream direction is increased, CMTS 130 can communicate this information to adaptive media rate controller 810 of FIG. 8 via one or more control messages 820. Upon receipt of this information, rate controller and media transcoder 920 of FIG. 9 can dynamically transcode one or more media signals from remote client devices $110_1$-$110_N$ to a codec format with a higher bitrate. Transcoding techniques and methods are known to a person of ordinary skill in the art.

In the upstream direction (e.g., media communication from local client devices $170_1$-$170_M$ to remote client devices $110_1$-$110_N$), the function of rate controller and media transcoder 920 of FIG. 9 operates in a similar manner as in the downstream direction. That is, based on the bandwidth usage information from CMTS 130 (via one or more control messages 820), rate controller and media transcoder 920 adapts one more data rates associated with the media signals from local client devices $170_1$-$170_M$, according to an embodiment of the present invention. If bandwidth is constrained in the upstream direction (e.g., a communication system that has upstream bandwidth restrictions due to an asymmetric communication protocol), local MCU 210 of FIG. 8 may encode the media signals from local client devices $170_1$-$170_M$ into a codec format with a low bitrate. Upon receipt of encoded media signal from cable modem 150, CMTS 150 can transfer the encoded media signal to adaptive media rate controller 810. In turn, rate controller and media transcoder 920 of FIG. 9 can transcode the media signal into one or more codec formats with bitrates appropriate for remote client devices $110_1$-$110_N$ and transfer the transcoded media signals to remote client devices $110_1$-$110_N$ via WAN network interface 910, according to an embodiment of the present invention.

In summary, rate controller and media transcoder 920 of FIG. 9 can perform the following functions:

- For an existing multimedia communication between local client devices $170_1$-$170_M$ and remote client devices $110_1$-$110_N$, the bitrate of a media signal can be lowered for a particular communication direction (e.g., upstream and downstream directions) when CMTS 130 indicates that a bandwidth constraint exists for that particular communication direction.
- For an existing multimedia communication between local client devices $170_1$-$170_M$ and remote client devices $110_1$-$110_N$, the bitrate of a media signal can be raised for a particular communication direction (e.g., upstream and downstream directions) when CMTS 130 indicates that an increase in bandwidth availability exists for that particular communication direction.
- For a new multimedia communication between local client devices $170_1$-$170_M$ and remote client devices $110_1$-$110_N$, an appropriate bitrate can be selected for one or more media signals based on real-time bandwidth usage information from CMTS 130.
- For a new multimedia communication between local client devices $170_1$-$170_M$ and remote client devices $110_1$-$110_N$, a different codec format can be applied to one or more local client devices $170_1$-$170_M$ from that of one or more remote client devices $110_1$-$110_N$ if the local and remote client devices do not support a common codec format.

In the above examples, the bandwidth usage information and codec format information can be communicated to rate controller and media transcoder 920 of FIG. 9 via one or more control messages 820. Based on the description herein, a person of ordinary skill in the art will recognize that rate controller and media transcoder 920 can perform other functions than those listed above. These other functions are within the spirit and scope of the present disclosure.

In reference to FIG. 9, service provisioning module 940 provisions one or more service levels to one or more subscribers (e.g., users of remote client devices $110_1$-$110_N$ and local client devices $170_1$-$170_M$) of communication network 800 of FIG. 8. The allocation of upstream and downstream bandwidth under various loading conditions of a communication network is referred to herein as a "service level." In an embodiment, service provisioning module 940 controls upstream and downstream bandwidth allocation for different subscribers under various CMTS loading conditions. For instance, service provisioning module 940 can allocate more or less upstream and downstream bandwidth to certain subscribers based on the subscriber's plan with a service provider of the communication network between CMTS 130 and CM 150 (e.g., DOCSIS communication network). That is, a first subscriber can have a service plan with a higher service level than a service plan of a second subscriber, where the first subscriber can have more upstream and downstream bandwidth allocated to its media signals communicated over a DOCSIS communication network between CMTS 130 and cable modem 150.

In summary, communication system 800 of FIG. 8 can accommodate for bandwidth restrictions in a communication network. The bandwidth restrictions can occur in either in the upstream or downstream directions of the communication network.

IV. EXAMPLE COMPUTER SYSTEM IMPLEMENTATION

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 10:
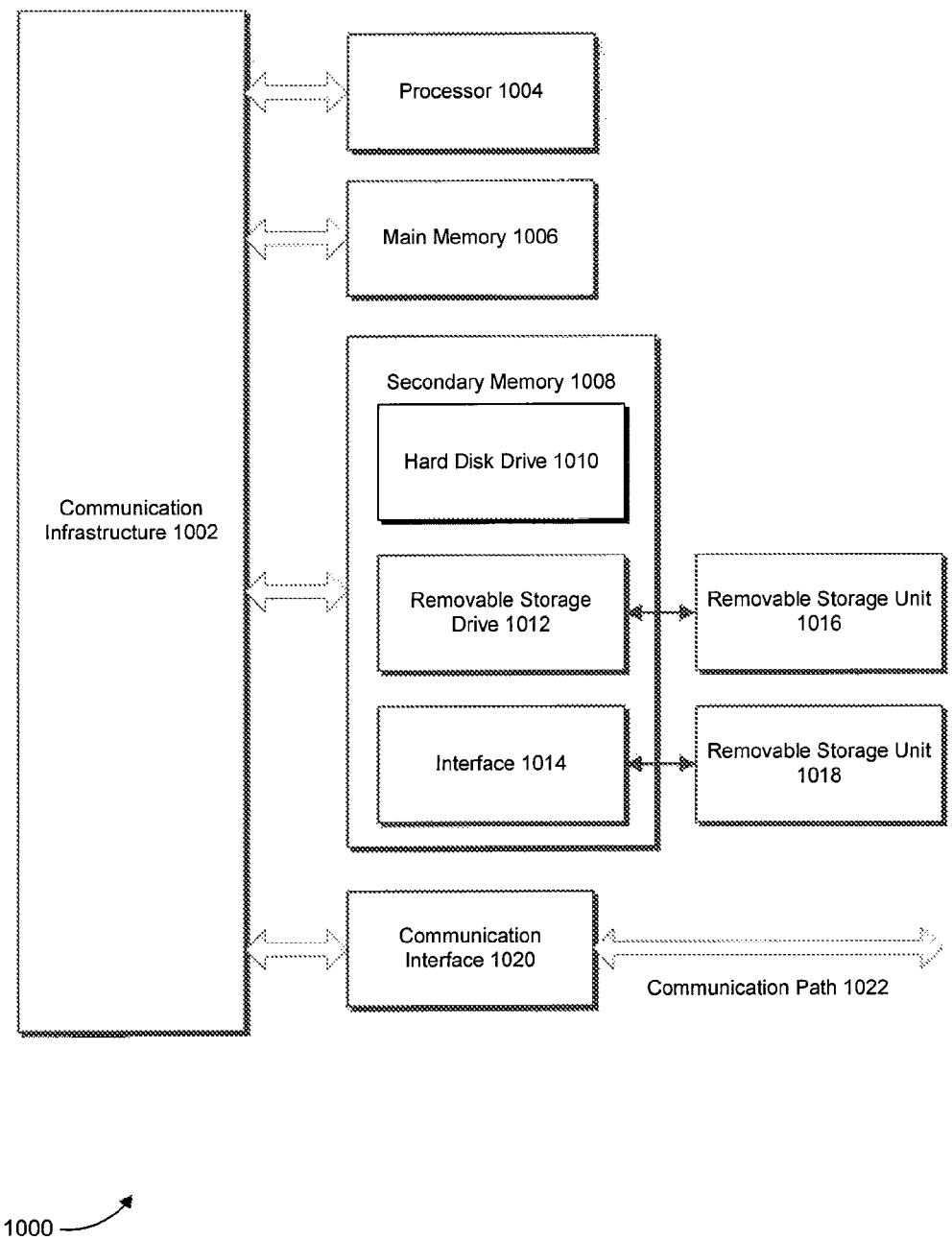
FIG. 10 is an illustration an example computer system that can be used to implement one or more aspects of one or more embodiments of the present invention.

The following description of a general-purpose computer system is provided for the sake of completeness. Embodiments of the present invention can be implemented in hardware, or as a combination of software and hardware. Consequently, embodiments of the present invention can be implemented in the environment of a computer system or other processing system. An example of such a computer system is shown in FIG. 10. At least one of the modules, and functions associated therein, depicted in FIGS. 4-6, 8, and 9 (e.g., media proxy 420 of FIGS. 4 and 6, adaptive media rate controller 810 of FIGS. 8 and 9, etc.) can be executed (or implemented using) on one or more distinct computer systems 1000.

Computer system 1000 includes one or more processors, such as processor 1004. Processor 1004 can be a special-purpose or a general-purpose digital signal processor. Processor 1004 is connected to a communication infrastructure 1002 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1000 also includes a main memory 1006, preferably random access memory (RAM), and can also include a secondary memory 1008. Secondary memory 1008 can include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 1016 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer-usable storage medium having stored therein computer software and/or data.

In alternative implementations, secondary memory 1008 can include other similar means for allowing computer programs or other instructions to be loaded into computer system 1000. Such means can include, for example, a removable storage unit 1018 and an interface 1014. Examples of such means can include a program cartridge and cartridge interface (such as that found in video game devices), a removable memory chip (such as an EPROM, or PROM) and associated socket, a thumb drive and USB port, and other removable storage units 1018 and interfaces 1014 which allow software and data to be transferred from removable storage unit 1018 to computer system 1000.

Computer system 1000 can also include a communications interface 1020. Communications interface 1020 allows software and data to be transferred between computer system 600 and external devices. Examples of communications interface 1020 can include a modem, a network interface (such as an Ethernet card), a communications port, a PCMCIA slot and card, etc. Software and data transferred via communications interface 1020 are in the form of signals, which can be electronic, electromagnetic, optical, or other signals capable of being received by communications interface 1020. These signals are provided to communications interface 1020 via a communications path 1022. Communications path 1022 carries signals and can be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive 1010. These computer program products are means for providing software to computer system 1000.

Computer programs (also called computer control logic) are stored in main memory 1006 and/or secondary memory 1008. Computer programs can also be received via communications interface 1020. Such computer programs, when executed, enable the computer system 1000 to implement the present disclosure as discussed herein. In particular, the computer programs, when executed, enable processor 1004 to implement the processes of the present disclosure, such as any of the methods associated with the embodiments described herein. Accordingly, such computer programs represent controllers of the computer system 1000. Where the disclosure is implemented using software, the software can be stored in a computer program product and loaded into computer system 1000 using removable storage drive 1012, interface 1014, or communications interface 1020.

In another embodiment, features of the embodiments disclosed herein are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

V. CONCLUSION

In the 1:N multimedia call example of Section II, embodiments of the present disclosure compensate for upstream bandwidth restrictions in communication systems with asymmetric communication protocols. In an embodiment, with respect to FIG. 4, media proxy 420 receives a single encoded media signal from CMTS 130 and duplicates the encoded media signal N times, in which a duplicate media signal is transferred to each of remote client devices $110_1$-$110_N$. In having media proxy 420 upstream of the DOCSIS communication network (e.g., in the WAN portion of communication system 400), the duplication function does not occur in the bandwidth-constrained portion of communication system 400 (e.g., DOCSIS US 230). As a result, the multimedia call between local client device $170_1$ and remote client devices $110_1$-$110_N$ is not constrained (e.g., sacrifice in the sound and video quality of the media signal) by the upstream bandwidth restrictions in broadband access systems such as, for example and without limitation, DOCSIS communication systems.

In the example of the M:N multimedia calls in Section III, embodiments of the present disclosure compensate for bandwidth restrictions in a communication system. In an embodiment, with respect to FIG. 8, adaptive media rate controller 810 adapts one more data rates associated with the media signals from remote client devices $110_1$-$110_N$ and local client devices $170_1$-$170_M$ based on bandwidth usage information from CMTS 130 (via one or more control messages 820). The adaptive media rate controller 810 can raise or lower the bitrate of a media signal for a particular communication direction (e.g., upstream and downstream directions) when CMTS 130 indicates that a bandwidth constraint exists for that particular communication direction. Adaptive media rate controller 810 can also select an appropriate bitrate for one or more media signals based on real-time bandwidth usage information from CMTS 130. Further, adaptive media rate controller 810 can apply a different codec format to one or more local client devices $170_1$-$170_M$ from that of one or more remote client devices $110_1$-$110_N$ if the local and remote client devices do not support a common codec format.

Although embodiments of the present disclosure are described in the context of a multimedia call over a DOCSIS communication network, based on the description herein, a person of ordinary skill in the art will recognize that embodiments of the present disclosure can apply to other types of communication networks and to other types of communication applications. Further, embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While various embodiments of the present disclosure have been described above, it should be understood that they have been presented by way of example only, and not limitation. It will be understood by a person of ordinary skill in the art that various changes in form and details can be made therein without departing from the spirit and scope of the embodiments described herein. It should be understood that this description is not limited to these examples. This description is applicable to any elements operating as described herein. Accordingly, the breadth and scope of this description should not be limited by any of the above-described exemplary embodiments. Further, the invention should be limited only in accordance with the following claims and their equivalents.

What is claimed is:

1. An apparatus comprising:
a first network interface configured to receive a single media signal from a local client device via a first communication network with an asymmetric communication protocol and to transmit a first plurality of media signals from a plurality of remote client devices over a second communication network;
a media dispatcher configured to duplicate the single media signal into a plurality of duplicate media signals; and
a second network interface configured to transmit the plurality of duplicate media signals to the plurality of remote client devices over the second communication network and to receive a second plurality of media signals from the plurality of remote client devices over the second communication network.

2. The apparatus of claim 1, further comprising:
a media relay configured to relay the second plurality of media signals from the second network interface to the first network interface; and
an authentication and billing module configured to control session and billing services of a peer-to-peer communication session between a local client device and the plurality of remote client devices.

3. The apparatus of claim 2, wherein the media relay is configured to relay the second plurality of media signals based on channel and processing capabilities associated with the local client device.

4. The apparatus of claim 2, wherein the media relay is configured to transcode the second plurality of media signals based on a bandwidth of one or more downstream channels.

5. The apparatus of claim 1, wherein the asymmetric communication protocol comprises a Data Over Cable Service Interface Specification or a Digital Subscriber Line communication protocol.

6. The apparatus of claim 1, wherein the media dispatcher is configured to receive the single media signal in an upstream channel of the first communication network with the asymmetric communication protocol.

7. The apparatus of claim 1, wherein the media dispatcher is configured to communicate with a cable modem termination system via the first network interface.

8. The apparatus of claim 1, wherein the single media signal, the first plurality of media signals, the plurality of duplicate media signals, and the second plurality of media signals comprise audio content, video content, or a combination thereof.

9. A system comprising:
a cable modem;
a cable modem termination system (CMTS) configured to transmit a first plurality of media signals to the cable modem over a first communication network with an asymmetric communication protocol and to receive a single media signal from a local client device over the first communication network; and
a media proxy configured to:
receive the single media signal from the CMTS via a second communication network;
transmit a plurality of duplicate media signals to a plurality of remote client devices over the second communication network;
receive a second plurality of media signals from the plurality of remote client devices over the second communication network; and
transmit the second plurality of media signals to the CMTS over the second communication network.

10. The system of claim 9, further comprising:
a local media control unit configured to transmit the single media signal from the local client device to the cable modem over a local area network.

11. The system of claim 9, wherein the asymmetric communication protocol comprises a Data Over Cable Service Interface Specification or a Digital Subscriber Line communication protocol.

12. The system of claim 9, wherein the media proxy is configured to receive the single media signal in an upstream channel of the first communication network with the asymmetric communication protocol and to transmit the second plurality of media signals to the CMTS over the second communication network based on channel and processing capabilities associated with the local client device.

13. The system of claim 9, wherein the single media signal, the first plurality of media signals, the plurality of duplicate media signals, and the second plurality of media signals comprise audio content, video content, or a combination thereof.

14. The system of claim 9, wherein the media proxy is configured to transcode the second plurality of media signals based on a bandwidth of one or more downstream channels.

15. A method comprising:
receiving, with a first network interface, a single media signal from a local client device via a first communication network with an asymmetric communication protocol;
transmitting, with the first network interface, a first plurality of media signals from a plurality of remote client devices over a second communication network;
duplicating the single media signal into a plurality of duplicate media signals;
transmitting, with a second network interface, the plurality of duplicate media signals to the plurality of remote client devices over the second communication network; and
receiving, with the second network interface, a second plurality of media signals from the plurality of remote client devices over the second communication network.

16. The method of claim 15, further comprising:
relaying the second plurality of media signals from the second network interface to the first network interface; and
controlling session and billing services of a peer-to-peer communication session between a local client device and the plurality of remote client devices.

17. The method of claim 16, wherein the relaying comprises relaying the second plurality of media signals based on channel and processing capabilities associated with the local client device.

18. The method of claim 16, wherein the relaying comprises transcoding the second plurality of media signals based on a bandwidth of one or more downstream channels.

19. The method of claim 15, wherein the duplicating comprises receiving the single media signal in an upstream channel of the first communication network with the asymmetric communication protocol.

20. The method of claim 15, wherein the duplicating comprises communicating with a cable modem termination system via the first network interface.

* * * * *